Patented June 5, 1945

2,377,433

UNITED STATES PATENT OFFICE 2,377,433

CONDENSATION PRODUCTS AND METHODS OF PREPARING AND USING THE SAME

Eugene Lieber, Staten Island, N. Y., assignor to Standard Oil Development Company, a corporation of Delaware No Drawing. Application November 9, 1940, Serial No. 365,017

15 Claims. (Cl. 260—671)

This invention relates to a novel type of chemical condensation product and to methods of preparing such products and using them for various purposes, more particularly as pour depressors in waxy lubricating oils.

Broadly, the invention comprises chemically condensing an aromatic-substituted aliphatic halide, preferably an aralkyl halide, with a low molecular weight alkyl halide. This condensation is preferably carried out by the use of a Friedel-Crafts catalyst according to the procedure commonly used for effecting such condensations.

The aromatic-substituted aliphatic halide to be used is preferably one having the general formula $ArRX_p$, where Ar represents an aromatic nucleus, R represents an aliphatic hydrocarbon group preferably containing from 1 to 5 carbon atoms and preferably is a saturated aliphatic group, and X represents a halogen, $p$ indicating the number of such halogen atoms present, which is preferably 1 to 3. It is preferred to use monoalkyl-substituted aromatic hydrocarbons containing 1 to 3 chlorine atoms in the alkyl group, and the chlorine atoms are preferably attached to the aliphatic carbon atom most remote from the aromatic nucleus. Examples of suitable aromatic-substituted aliphatic halides are:

Benzyl chloride, $C_6H_5CH_2Cl$

Benzal chloride, $C_6H_5CHCl_2$

Benzo-trichloride, $C_6H_5CCl_3$

Chlormethyl naphthalene, $C_{10}H_7CH_2Cl$

Chlormethyl anthracene, $C_{14}H_9CH_2Cl$

Chlormethyl diphenyl, $C_{12}H_9CH_2Cl$

Chlormethyl xylene, $C_8H_9CH_2Cl$

Gamma-dichlorpropyl diphenyl, $C_6H_5C_6H_4(CH_2)_2CHCl_2$

Thus it is preferred to use aromatic-substituted aliphatic halides having the general formula $Ar-C_nH_mX_p$, where Ar is an aromatic group containing one or more nuclei, $n=1$ to 5, $m=(2n-2)$ to $2n$, X is a halogen, preferably chlorine, and $p=1$ to 3.

The other reactant to be used is an alkyl halide which may be represented by the formula $R'X'$, where $R'$ is an aliphatic hydrocarbon group, preferably saturated, i. e., an alkyl group containing less than 7 carbon atoms, and X' is a halogen atom. R' may contain the same number of carbon atoms as R in the first reactant mentioned above, or a different number of carbon atoms; and likewise X' may be the same halogen as X, or a different one. It is important, however, that X' be only a single halogen atom. R' preferably contains 3 to 5 carbon atoms, the amyl compounds being most particularly preferred because they are available commercially in large quantities and at low cost and seem to be most effective for the purposes of this invention.

In particular, the mono-chlorinated pentanes of commerce have been found exceedingly useful for this invention. They contain but 5 carbon atoms, can be represented by the formula $C_5H_{11}$-Cl, and consist of a mixture of various isomers of monochlor pentanes (mixed amyl chlorides). Experiments indicate that they are essentially free of dichlor pentanes and higher polychlor pentanes.

The halogen to be used for either X or X' is preferably chlorine from an economic point of view, although the other halogens, i. e., the bromine, iodine and fluorine may be used, if desired, under some particular circumstances.

To effect the condensation, it is preferred to use a Friedel-Crafts catalyst, preferably anhydrous aluminum chloride, although other Friedel-Crafts catalysts can be used, such as, boron fluoride, zinc chloride, ferric chloride, titanium tetrachloride, boron trichloride and in some cases even anhydrous hydrogen fluoride.

The proportions in which the reactants should be used are about ½ to 10 mols, or preferably 1 to 3 mols, of the alkyl halide to 1 mol of the aromatic-substituted aliphatic halide. The amount of catalyst to be used may vary over a very wide range, depending partly upon the nature and amount of the reactants as well as upon the temperature and time of the reaction, but usually it should be about .01 to 0.5, preferably .05 to 0.2 of a mol per mol of aromatic reactant. In carrying out the invention, the reaction temperature should be maintained between the approximate limits of room temperature and about 350° F. It is preferred to add the catalyst to the reactants gradually at room temperature and then to heat the reaction mass to a temperature of between about 150° to 250° or 300° F. and to maintain it there for a sufficient length of time which may be only a few minutes or an hour or so, preferably about 5 to 30 minutes, to produce the desired product. Somewhat lower temperatures require a much longer reaction time and are not preferred for practical reasons.

The condensation is preferably carried out in the presence of an inert solvent, such as a highly refined naphtha or kerosene (which has preferably been pretreated with strong sulfuric acid or aluminum chloride), or other suitable solvent, such as tetrachlorethane, carbon disulfide, etc., although in some cases it is not necessary to use a solvent. After the reaction has been completed, which may in many cases be judged by the approximate cessation of the evolution of hydrogen chloride (or other hydrogen halide), the reaction mixture is cooled and preferably diluted with a suitable inert diluent, such as the refined kerosene mentioned above, and hydrolyzed or neutralized by any of the known methods, such as by adding water, aqueous caustic soda solution, or alcohol, or a mixture of water and alcohol, etc. The kerosene extract is allowed to settle and the catalyst sludge layer is drawn off and discarded. The kerosene extract is now filtered, if necessary, to remove any small quantity of insoluble rubbery polymer, the formation of which is probably due to some of the aralykyl halide condensing alone without any (or without sufficient amount of) alkyl halide. The extent of this reaction is very small and does not detract greatly from the yield of the desired product. The kerosene extract after filtration is then distilled, preferably with fire and steam or by distillation under vacuum to about 600° F. in order to remove solvent and low-boiling products.

The condensation product of this invention is soluble in mineral lubricating oils and is substantially non-volatile at 600° F., having very high molecular weight. In most cases it is a brown, brittle resin which is very hard. The exact structure of this condensation product is not known with certainty but it is believed to be essentially a linear high molecular weight compound consisting essentially of a chain of alternate aromatic and aliphatic hydrocarbon groups with short, free aliphatic side chains on a large proportion of the aromatic groups, these side chains being numerous enough and of sufficient number of carbon atoms to make the entire compound soluble in hydrocarbon oils.

The product of this invention has the property of modifying the crystal structure of waxes, such as paraffin wax, when added to compositions, especially liquid or solid hydrocarbon substances containing the same. For instance, when about .05–10.0%, preferably 0.2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax, or compositions containing the same, to be used for various purposes such as for coating or impregnating paper, etc., or for making various molded products.

Although the general method described hereinabove for preparing this condensation product is preferred due to simplicity of operation and efficiency, it is also possible to make a product having substantially similar properties, and perhaps more or less identical in chemical structure, by first subjecting the aromatic-substituted aliphatic halide, preferably an aralykyl halide, such as benzyl chloride, alone to chemical condensation or polymerization by a Friedel-Crafts catalyst, such as aluminum chloride, to produce a product which has a high molecular weight but is not soluble, or at least not sufficiently soluble, in mineral lubricating oils, and then subjecting that polymerization product to alkylation by a low molecular weight alkyl halide such as the amyl chloride discussed above in the presence of a Friedel-Crafts catalyst, such as aluminum chloride.

For the sake of illustration but without desiring to limit the invention to the materials used, the following experimental data are given.

A series of tests were made in which 126 grams of benzyl chloride was used as the aromatic-substituted aliphatic halide, and in which various amounts of commercial mixed amyl chlorides were used as the alkyl halide. The exact amount of amyl chloride used in each case, the kind and amount of catalyst and solvent, the temperature at which the reaction mass was heated and the time maintained at such temperature are all shown in the accompanying table, together with the yield of the resulting condensation product and the pour points obtained when 1% or 2% of those products were dissolved in a waxy lubricating oil having a pour point of +30° F. The pour-point determinations were made by the standard A. S. T. M. method.

The method of carrying out the condensation reactions consisted in mixing the benzyl chloride with the amyl chloride and dissolving the mixture in the solvent, the resulting solution being placed in a suitable reaction vessel fitted with a chemical stirrer and thermometer and a suitable outlet for HCl gas. Then the catalyst was slowly added while agitating the reaction mixture and maintaining the reaction temperature at 80° to 90° F. The reaction was in most cases extremely vigorous and the catalyst was added slowly over a period of one hour. After the addition of the catalyst the reaction temperature was raised to the temperature indicated in the table and maintained thereat for the time indicated in the table, at which time the evolution of hydrogen chloride gas had practically ceased. The recovery of the condensation product from the reaction mass was accomplished in the manner described hereinbefore.

TABLE

| Test No. | Amyl chloride, gms. | Catalyst | | Solvent | | Temp., °F. | Time | | Yield, gms. | Product pour point (°F.) per cent addition | |
|---|---|---|---|---|---|---|---|---|---|---|---|
| | | Name | Gms. | Name | Ccs. | | Hrs. | Min. | | 1 | 2 |
| 1 | 106 | AlCl$_3$ | 10 | Tetrachlorethane | 200 | 200 | | 20 | 80 | | −10 |
| 2 | 212 | ...do... | 10 | ...do... | 200 | 200 | | 30 | 115 | | 0 |
| 3 | 212 | ...do... | 10 | Kerosene | 200 | 200 | | 30 | 104 | | +5 |
| 4 | 106 | ...do... | 10 | Tetrachlorethane | 200 | 85 | 16 | | 59 | | 0 |
| 5 | 212 | FeCl$_3$ | 10 | ...do... | 200 | 200 | | 5 | 73 | 0 | −20 |

It is noted from the data in the above table that the condensation products obtained had good pour-depressing properties. An addition of 2% to a waxy oil having a pour point of 30° F. caused the resulting blend to have a pour point ranging from +5° F. to as low as −20° F.

It is not intended that this invention be limited to any of the specific examples which were given merely for the sake of illustration nor to any theory as to the mechanism of the operation of the invention but only by the appended claims.

I claim:

1. The process which comprises reacting a mixture of an aromatic-substituted aliphatic halide having the general formula $ArC_nH_mX_p$, where Ar is an aromatic group, $n=1$ to 5, $m=(2n-2)$ to $2n$, X is halogen, and $p=1$ to 3, a low molecular weight alkyl halide, and a Friedel-Crafts catalyst, at a temperature between about room temperature and about 350° F., to make an oil-soluble condensation product substantially non-volatile at 600° F.

2. The process which comprises treating a mixture of a compound having the general formula $ArRX_p$, where Ar represents an aromatic group, R is an aliphatic group, X is a halogen, and $p=1$ to 3, and a low molecular alkyl halide having the general formula $R'X'$, in which $R'$ contains less than 7 carbon atoms, with a Friedel-Crafts catalyst at a temperature between about room temperature and about 350° F. until a high molecular weight condensation product of said $ArRX_p$ and said $R'X'$ is formed, stopping the reaction while the products are still soluble in mineral oil, and recovering from the reaction product a fraction substantially non-volatile under distillation up to about 600° F. under reduced pressure.

3. The process which comprises subjecting to a Friedel-Crafts condensation with aluminum chloride at a temperature between about room temperature and about 350° F. a mixture of a compound having the general formula $$ArC_nH_mCl_p$$

where Ar is an aromatic group, $n=1$ to 5, $m=(2n-2)$ to $2n$, and $p=1$ to 3, and an alkyl halide having less than 7 carbon atoms, and recovering from the reaction product a fraction substantially non-volatile under distillation up to about 600° F. under reduced pressure.

4. The process according to claim 3 in which the aromatic compound used is a phenyl alkyl monochloride.

5. Process according to claim 3 in which the aromatic compound used is an aryl methyl chloride.

6. The process which comprises condensing one mol of an aralkyl chloride with ½ to 10 mols of an alkyl chloride having less than 7 carbon atoms by a Friedel-Crafts catalyst at a temperature between the approximate limits of 100° F. and 350° F. for a long enough time to produce a high molecular weight condensation product substantially non-volatile at 600° F. and stopping the reaction while the reaction products are still soluble in mineral oil.

7. The process of preparing wax-modifying agents having pour-depressing properties which comprises condensing one mol of benzyl chloride with about 1 to 3 mols of amyl chloride by means of aluminum chloride as catalyst, at a temperature between the approximate limits of 100° F. and 350° F. to produce a high molecular weight oil-soluble condensation product, cooling and diluting the reaction mass with an inert solvent, hydrolyzing and removing the catalyst, settling and removing the catalyst layer and distilling the solution of the condensation product and inert solvent with fire and steam to about 600° F. to remove the solvent and low-boiling products, and to obtain the desired wax-modifier as distillation residue.

8. The process which comprises subjecting an aromatic-substituted aliphatic halide having the general formula $ArC_nH_mX_p$, where Ar is an aromatic group, $n=1$ to 5, $m=(2n-2)$ to $2n$, X is halogen, and $p=1$ to 3 to polymerization and condensation in the presence of a Friedel-Crafts catalyst at about 100–350° F. to make a high molecular weight product and alkylating the latter with an alkyl halide to make an oil-soluble, high molecular weight product having pour-depressing properties.

9. A high molecular weight resinous product soluble in waxy lubricating oils and in paraffin wax, substantially non-volatile at 600° F. under reduced pressure, comprising essentially a condensation product of a compound having the general formula $ArC_nH_mX_p$, where Ar is an aromatic group, $n=1$ to 5, $m=(2n-2)$ to $2n$, X is halogen, and $p=1$ to 3, and an alkyl halide having less than 7 carbon atoms.

10. A pour depressor which is essentially a Friedel-Crafts condensation product of one mol of benzyl chloride with about ½ to 10 mols of amyl chloride, said product being soluble in waxy lubricating oils and in paraffin wax, and having wax modifying properties.

11. A pour depressor which is essentially a Friedel-Crafts condensation product of chlormethyl naphthalene with amyl chloride, said product being soluble in waxy lubricating oils and in paraffin wax, and having wax modifying properties.

12. A high molecular weight essentially hydrocarbon product soluble in waxy lubricating oils and in paraffin wax, substantially non-volatile at about 600° F. and having a chemical structure represented by a linear chain of alternate aromatic and aliphatic hydrocarbon groups having short, free, aliphatic side chains on a large proportion of said aromatic groups, said product being a condensation product of an aromatic-substituted aliphatic halide having the general formula $ArC_nH_mX_p$, where Ar is an aromatic group, $n=1$ to 5, $m=(2n-2)$ to $2n$, X is halogen, and $p=1$ to 3, and an alkyl halide having less than 7 carbon atoms.

13. The process according to claim 3 in which the alkyl halide is amyl chloride.

14. Product according to claim 9 being a condensation product of one mol of benzyl chloride with about ½ to 10 mols of amyl chloride.

15. Product according to claim 9 being a condensation product of chlor methyl naphthylene with amyl chloride.

EUGENE LIEBER.